United States Patent [19]

Bible

[11] Patent Number: 5,140,741
[45] Date of Patent: Aug. 25, 1992

[54] METHOD OF REMOVING AN AUTOMOTIVE HEAD LINER

[76] Inventor: Kenneth G. Bible, 201 Butler Dr., Greenville, S.C. 29611

[21] Appl. No.: 583,216

[22] Filed: Sep. 17, 1990

Related U.S. Application Data

[62] Division of Ser. No. 512,322, Apr. 23, 1990, abandoned.

[51] Int. Cl.⁵ .............................................. B23P 19/00
[52] U.S. Cl. .................................. 29/426.6; 29/426.5; 29/426.1; 29/402.03; 29/278
[58] Field of Search ............... 29/426.1, 426.5, 426.6, 29/402.01, 402.03, 267, 270, 278; 254/25

[56] References Cited

U.S. PATENT DOCUMENTS 1,684,526  9/1928  Tucker et al. .................. 29/270
4,630,338 12/1986  Osterland et al. ............. 52/718.1

Primary Examiner—P. W. Echols
Assistant Examiner—David P. Bryant
Attorney, Agent, or Firm—Bailey & Hardaway

[57] ABSTRACT

A tool for removing an automotive head liner clip is illustrated having a flat arcuate handle A with a pair of thin, flat, spaced projections B having a pair of inner surfaces C for flexing the prongs of the clip together for removing the head liner molding clip.

1 Claim, 2 Drawing Sheets

METHOD OF REMOVING AN AUTOMOTIVE HEAD LINER

This application is a division of application Ser. No. 07/512,332, filed Apr. 23, 1990, now abandoned.

BACKGROUND OF THE INVENTION

Removal of a head liner trim molding for removal of the head liner requires removing the clips which have resilient downwardly projecting prongs for attachment to a frame member beneath the roof of the automobile. This has been accomplished in the past by attempting to insert the blades of a pair of screw drivers between the molding and the clip to squeeze together the depending resilient prongs of the clip. The difficulties of manipulating a pair of screw drivers in this manner are apparent and may result in damage to the head liner and the molding.

Accordingly, it is an important object of this invention to provide a tool which, by inserting it between the head liner and the head liner trim molding, the clips may be readily removed for removal of the head liner.

Another important object of the invention is to provide a tool such as described above which may be modified to remove head liner clips where space is limited for insertion of the tool by inserting a curved tool and squeezing the jaws of the tool together to remove the head liner clip.

Another important object of the invention is to provide an integral tool for removing automobile head liner clips having an auxiliary end carried by a curved handle for removal of single prong clips.

SUMMARY OF THE INVENTION

It has been found that a tool may be provided for removing automotive head liner clips having a flat arcuate handle with a pair of flat spaced projections having diverging camming inner surfaces for flexing the prongs of the clip together for removing the head liner. A modified form of the invention may include projections in the form of a pair of opposed pivoted jaws.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate a tool for removing a head liner clip having spaced resilient holding prongs for insertion between the head liner trim molding and a curved head liner. A flat arcuate handle means A has a curvature compatible with that of the head liner. A pair of thin, flat, spaced projections B extending integrally from an end of the handle means forwardly and are generally a continuation of the handle so as to be compatible therewith for insertion between the molding and the head liner. A pair of inner surfaces C are carried by the spaced projections extend on each side of the clips for flexing the prongs together releasing the clip and the head liner carried thereby.

Figure 1:
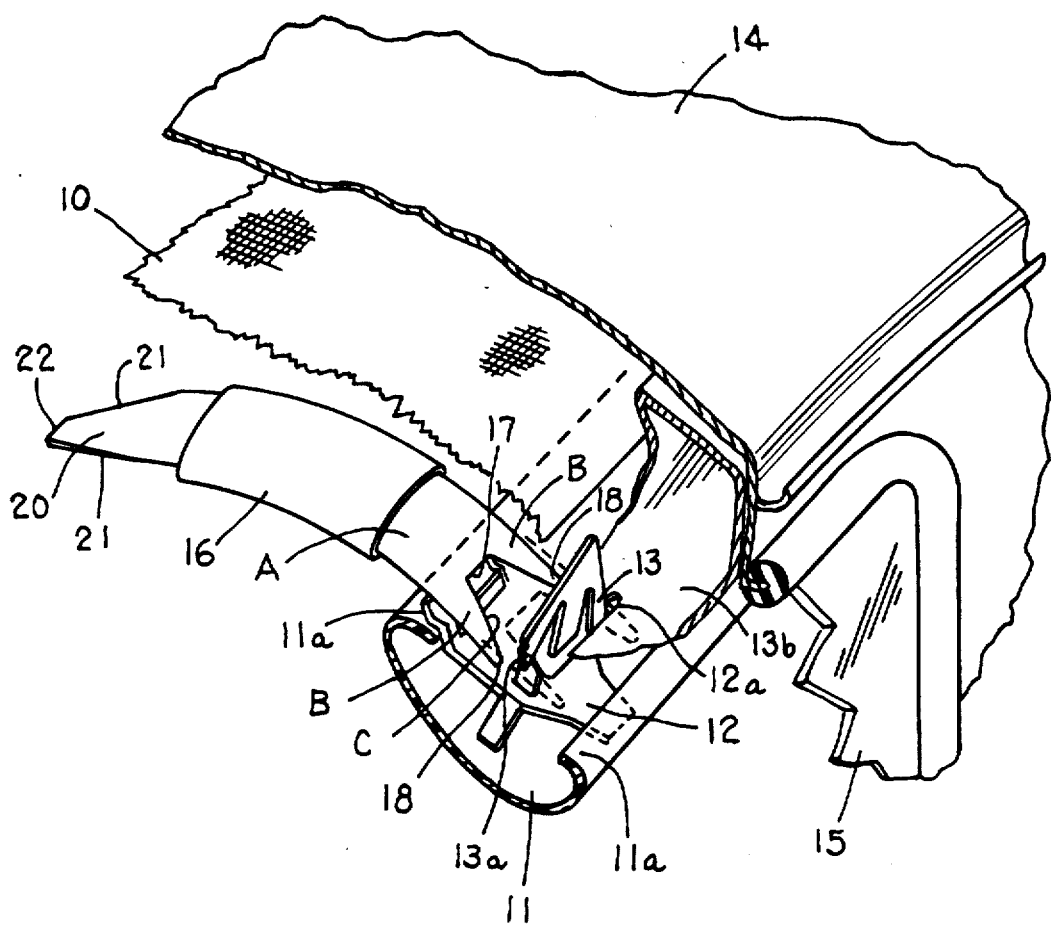
FIG. 1 is a perspective view illustrating a tool for removing automobile head liner clips constructed in accordance with the present invention inserted between the head liner trim mold and the head liner of an automobile.

FIG. 1 illustrates a head liner 10 positioned by the usual head liner trim molding 11 by a clip 12 which includes a pair of depending resilient prongs 13. The prongs 13 have a serrated edge 13a to facilitate engagement with the head liner frame 13b and with the conventional screw driver for flexing or squeezing the prongs together for removal of the clip 12. The depending prongs 13 engage a portion of the frame 13b adjacent the ends of a slot 12a in the frame for securing the clip which is thus retained beneath the rolled edges 11a of the molding. The head liner is schematically illustrated in FIG. 1 as being positioned beneath the roof 14 of the automobile above the windows 15. The tool has a handle A which is flat and generally curved to facilitate insertion between the molding and the head liner. The tool must be curved in order to be compatible with the generally curved configuration defined by the head liner and the molding.

Figure 2:
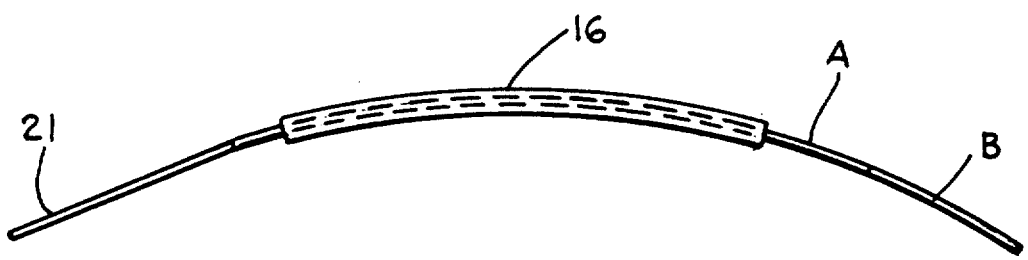
FIG. 2 is an enlarged side elevational view of the tool shown in FIG. 1.

The tool illustrated in FIGS. 1 and 2 is integrally constructed of resilient tempered stainless steel and is provided with an intermediate handle portion 16, on the curved handle A, constructed of a tough vinyl grip material. The handle A has a pair of projections B in the form of thin, flat fork like members having diverging inner surfaces C. The fork like projections B have an intermediate notched portion defined by the base member 17, the surfaces C and by curved tips illustrated at 18. As the tool moves in a forward direction, the width of the intermediate notched portion at the plane defined by the resilient prongs 13 decreases such that the surfaces C progressively flex the resilient prongs 13 inwardly. The projections B are inserted as shown in FIG. 1 for engaging the serrated surfaces 13a depressing or squeezing together the resilient prongs 13 for releasing the clips from the head liner frame. Preferably the projections B are curved as shown so long as they are generally a continuation of the curved handle A and compatible therewith for fitting into the space available beneath the head liner.

At an opposite end of the tool a single projection member 20 is illustrated as having converging sides 21 and a flat straight tip member 22 for removal of the clips having a single resilient prong. FIG. 2 illustrates the sides of the tip 21 and a side view of the vinyl grip portion 16 of the handle and illustrates the general curvature of the arcuate tool for insertion between the clip and the head liner.

Figure 3:
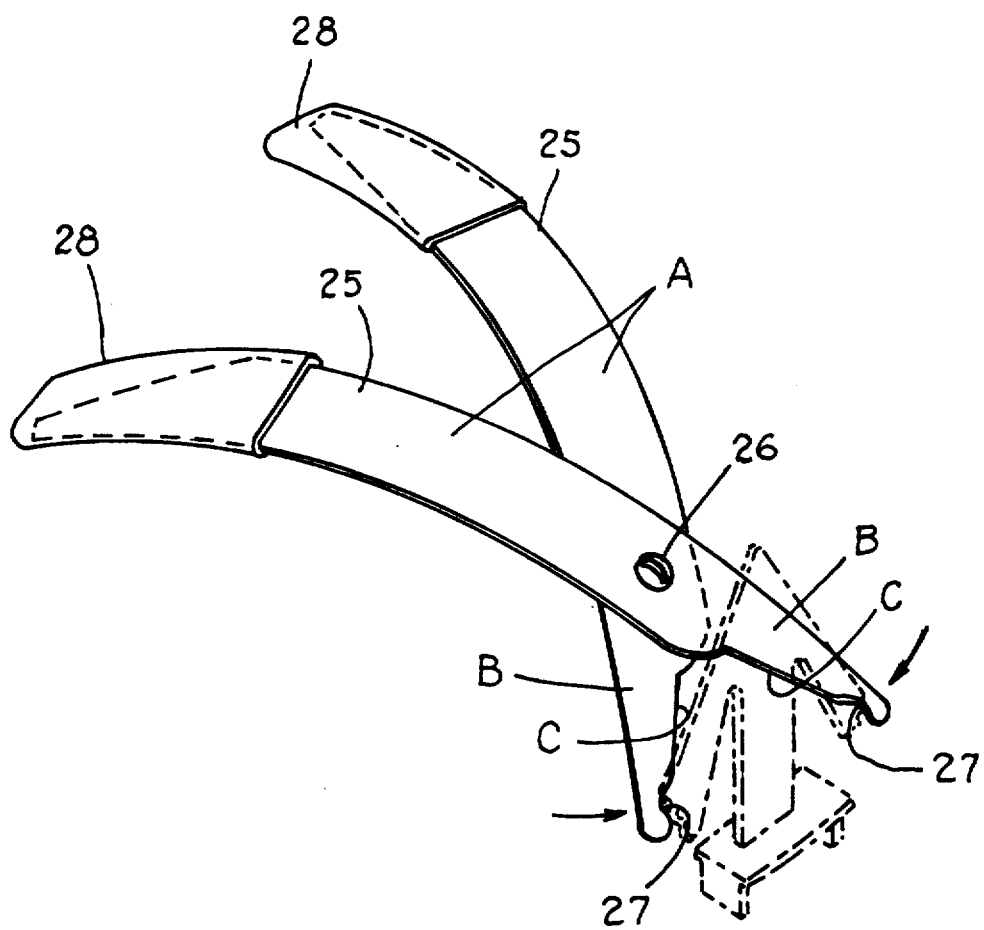
FIG. 3 is a perspective view of a modified form of the invention including a pair of movable jaws.

FIG. 3 illustrates a modified form of the invention wherein the handle member A includes a pair of flat crossed handle portions 25 which are pivoted intermediate their ends as at 26 to form opposed surfaces C carried by the integral projections B. The surfaces C include prong engaging recesses at the tips 27 in the surfaces C. Vinyl gripping elements are illustrated at 28. Such a modified tool is useful as in areas such as those adjacent the rear windows of automobiles wherein the depth to which the projections may be inserted is limited. By inserting the tips and working the handles to close the projections or jaws, only a limited depth of insertion of the projections B is required. This modified tool may be effectively used in conjunction with the simplified unitary version described above to simplify facilitating use by an upholsterer or trimmer.

While a preferred embodiment of the invention has been described using specific terms, such description is for illustrative purposes only, and it is to be understood that changes and variations may be made without departing from the spirit or scope of the following claims.

What is claimed is:

1. The method of removing a head liner secured beneath the roof of an automobile to a head liner molding by a clip having depressible double prongs comprising the steps of:

inserting a clip removal tool between the head liner and head liner molding;

wherein said clip removal tool has a flat arcuate handle means having a curvature compatible with that of a head liner and a pair of thin, flat, spaced projections extending integrally from an end of said handle means forwardly compatible with said curvature of the handle means, said spaced projections having a pair of inner surfaces for engaging outer pronged surfaces of said clip;

flexing said clip prongs inwardly by a forwardly directed motion of said tool, thereby releasing the clip from the head liner;

removing said head liner molding and said clip; and removing said head liner.

* * * * *